United States Patent [19]
Rainville et al.

[11] Patent Number: 5,361,483
[45] Date of Patent: Nov. 8, 1994

[54] COMPOSITE FASTENERS AND METHOD FOR FASTENING STRUCTURAL COMPONENTS THEREWITH

[75] Inventors: Gilles A. Rainville, Northridge; Leonardo Israeli, Pacific Palisades, both of Calif.

[73] Assignee: Rockwell International Corp., Seal Beach, Calif.

[21] Appl. No.: 795,284

[22] Filed: Nov. 19, 1991

Related U.S. Application Data

[63] Continuation of Ser. No. 51,543, May 19, 1987, abandoned.

[51] Int. Cl.$^5$ .................. B21D 39/00; F16B 19/06
[52] U.S. Cl. .................. 29/524.1; 29/525.2; 403/265; 411/504; 411/507; 411/908
[58] Field of Search ............. 411/504, 501, 505–507, 411/901, 82, 907–909, 258, 43, 512; 156/293, 294; 403/265, 270, 380, 408.1; 29/524.1, 525.2

[56] References Cited

U.S. PATENT DOCUMENTS

| | | | |
|---|---|---|---|
| 2,458,152 | 1/1949 | Eakins | 29/524.1 X |
| 2,510,693 | 6/1950 | Green | 411/908 X |
| 2,685,813 | 8/1954 | Lampman et al. | 411/908 X |
| 3,754,310 | 8/1973 | Shea | 29/609 |
| 4,253,226 | 3/1981 | Takeda | 29/524.1 X |
| 4,329,915 | 5/1982 | Schulz | 403/265 X |
| 4,477,394 | 10/1984 | Armstrong et al. | 261/112.1 |
| 4,478,544 | 10/1984 | Strand | 411/501 X |
| 4,560,428 | 12/1985 | Sherrick et al. | 156/94 |
| 4,609,315 | 9/1986 | Briles | 411/501 X |
| 4,687,394 | 8/1987 | Berecz | 411/908 X |
| 4,687,395 | 8/1987 | Berecz et al. | 411/501 X |
| 4,687,396 | 8/1987 | Berecz | 411/908 X |
| 4,687,398 | 8/1987 | Berecz | 411/908 X |
| 4,718,801 | 1/1988 | Berecz | 411/908 X |

FOREIGN PATENT DOCUMENTS

| | | | |
|---|---|---|---|
| 488185 | 11/1952 | Canada | 29/509 |
| 15958 | 2/1977 | Japan | 411/501 |
| 812993 | 3/1981 | U.S.S.R. | 411/501 |

*Primary Examiner*—Lloyd A. Gall
*Attorney, Agent, or Firm*—Charles T. Silberberg; Terrell P. Lewis; Max Geldin

[57] ABSTRACT

A composite fastener, preferably in the form of a rivet, which comprises a shank having a first head integrally formed on one end thereof, the shank and head formed of a high temperature thermoplastic matrix material selected from the group consisting of a polyether ether ketone resin and a polyamide imide resin, and having continuous reinforcing fibers, such as graphite fibers, axially oriented in substantially parallel relation throughout the shank, the fibers being flared and extending continuously into the head and substantially evenly flared and swaged therein, thereby forming a fastener having high shear and high tensile characteristics. The rivet is installed to fasten a plurality of structural components together by providing a conical tip on a forming tool, such as a heat gun or ultrasonic welding device for plastics, placing the tip in contact with the central portion of the other end of the rivet and upsetting and melting the matrix material under controlled conditions to form a second head, the fibers in the second head being flared and extending continuously into the second head and evenly swaged therein. Where the structural components are composite thermoplastic components, the heating of the rivet head to upset same heats the adjacent composite structure in contact with the head and, upon solidification, forms a substantially integral unit.

19 Claims, 3 Drawing Sheets

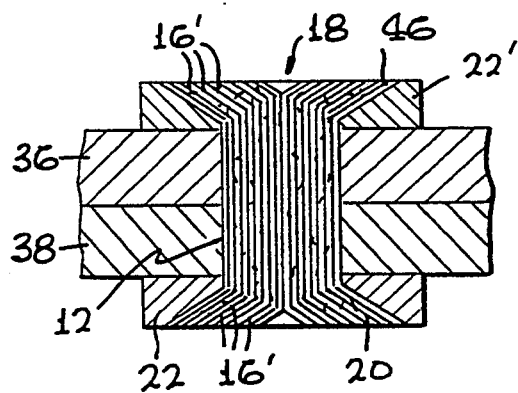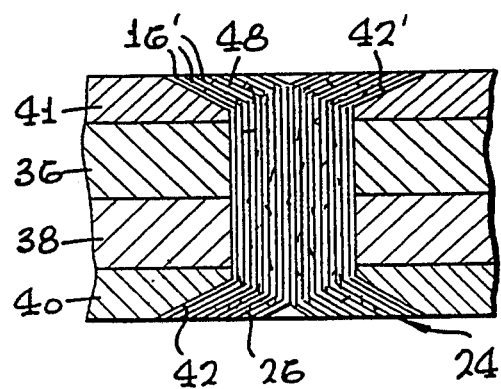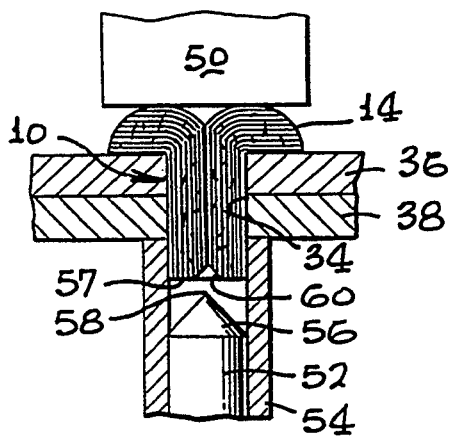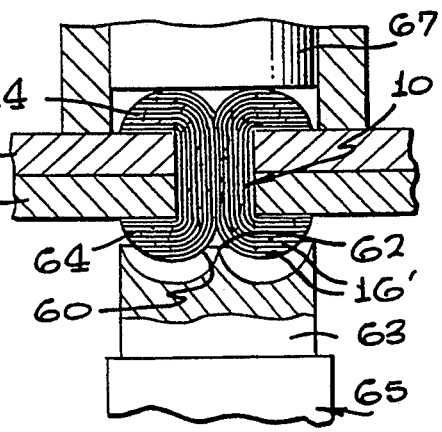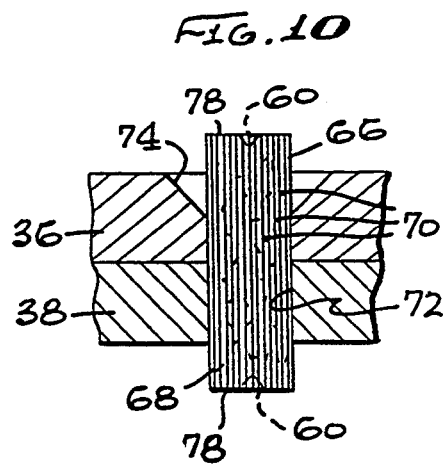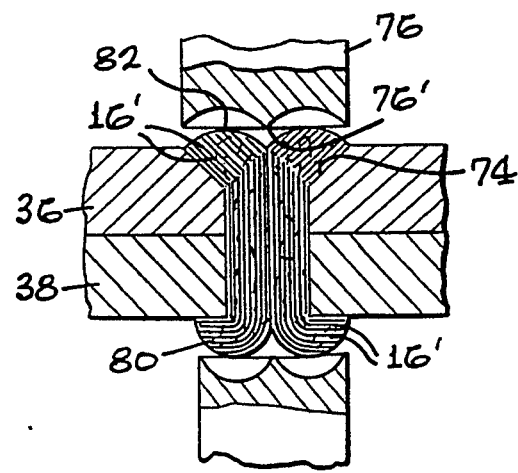

5,361,483

COMPOSITE FASTENERS AND METHOD FOR FASTENING STRUCTURAL COMPONENTS THEREWITH

This application is a continuation of U.S. Ser. No. 07/051,543, filed May 19, 1987, now abandoned.

BACKGROUND OF THE INVENTION

This invention relates to high-strength composite fasteners and is particularly directed to fiber-reinforced thermoplastic fasteners, such as rivets, and to a method for fastening structural components, especially composite components, with such fasteners, utilizing novel tooling for softening and reshaping the thermoplastic material of the fastener to achieve fastening therewith.

Composite materials in the form of fiber-reinforced plastics or resins are replacing metal structural components in the aerospace industry because of their high strength to weight ratios and high stiffness. The fibers provide strength and stiffness, and the matrix provides the binding material for these fibers. One form of organic composites presently employed is of the thermosetting type which is fabricated to a predetermined shape and then cured at a specific elevated temperature.

A new generation of composites are of the thermoplastic type. In these composites, the matrix softens when brought up to a specific elevated temperature and solidifies on cooling. This property provides the opportunity to shape and reshape the thermoplastic by merely bringing the structural component up to or above this forming temperature.

While both types of composite materials, thermosetting and thermoplastic, have gained wide usage in aerospace structures, their drawback has consisted in a lack of a suitable method for attachment between the structural composite components. The bonding together of composite structures is not sufficiently dependable and separation, that is, peeling of the bonding, often occurring. Presently, the bonding of composite components is supplemented by limited fastening.

The more conventional method for fastening composites is by the use of metal fasteners. However, aluminum fasteners are generally not compatible with fiber-reinforced composites, and while titanium fasteners are generally compatible with such composites, such fasteners are heavy and expensive. Further, such fasteners require large heads to avoid "pulling through" failure.

U.S. Pat. No. 2,510,693 to Green discloses a rivet formed of plastic material having fibers therein running longitudinally in the stem of the rivet and extending into the head of the rivet in laterally spreading relation. In fastening a pair of components by means of the rivet, the end of the rivet is upset by means of pressure applied thereto by a heated riveting tool to form a head. However, the fibers are relatively randomly distributed in the stem and in the head of the rivet, and the resulting rivet lacks high-tension capability.

U.S. Pat. No. 2,685,813 to Lampman, et al, discloses a prefabricated glass fiber rivet body comprised of a plurality of glass fiber threads grouped together to extend longitudinally in the rivet body, the body being impregnated with a partially cured plastic binder, and a thermoplastic sleeve, the rivet body being adapted to be upset by heat and pressure to provide a solid-headed rivet. In use, the rivet body is subjected to heat and pressure to laterally crush outwardly the ends of the glass fiber threads to form the heads in countersunk portions of the bores of the components to be fastened together. In this arrangement, wherein the ends of the rivet body are subjected to heat and pressure to laterally crush the fibers outwardly, there is a lack of control of the orientation of the fibers in the rivet, particularly in the heads of the rivet, and the resulting rivet has only low-tension capability. Further, rivets of this type can only be used with countersunk holes in the components being fastened and cannot be employed for the production of protruding head fasteners or rivets, wherein countersunk holes are not provided in the structural components to be fastened.

U.S. Pat. No. 4,478,544 to Strand discloses a reinforced thermoplastic rivet comprising a plurality of substantially parallel continuous longitudinally extending carbon fibers encapsulated in a B-stage thermoset resin and a plurality of longitudinally extending polyamide fibers enveloping the carbon fibers. The rivet is deformable to form a rivet head upon heating. However, in this procedure the fibers in the head are crushed, without control of the position and direction of the fibers.

Due to the haphazard non-uniform orientation of the fibers in the plastic matrix of the stem and/or head of the rivets disclosed in each of the above patents, while such rivets exhibit satisfactory shear capability, they lack good capability in tension.

It is an object of the present invention to provide novel high-strength composite fasteners, particularly rivets, having superior high-shear and high-tension capability.

Another object of the invention is the provision of an improved high-strength composite fastener, particularly rivets, especially designed for aircraft applications, and wherein suitable reinforcing fibers are embedded in a high temperature thermoplastic matrix and wherein the fibers are so oriented in both the shank and heads of the fastener so as to result in a fastener having both high-shear and high-tension performance.

A further object of the invention is to provide a high-strength composite fastener, e.g., rivets, of the above type, and to a novel method and tooling for upsetting such fastener to form a second head and produce fastening of a plurality of structural components by such fastener.

SUMMARY OF THE INVENTION

The above objects and advantages are achieved according to the invention by the provision of a high-strength composite fastener, particularly in the form of a rivet, based on the use of, for example, cylindrical, fiber-reinforced, high temperature thermoplastic composites, and forming heads at both ends. One head can be preformed and the second formed during installation of the fastener for fastening composite structural members.

The reinforcing fibers are axially or longitudinally oriented and aligned in substantially parallel relation throughout the shank or fastener body. A preformed head is provided on one end of the fastener and a second head is provided on the other end of the fastener during installation thereof. Both heads of the fastener are formed by flaring the ends of the fastener shank employing a heated forming tool or heat gun, or by means of an ultrasonic welding tool, in each case having a special conical tip. In the forming of such heads, the fibers are bent, and such bending is controlled so that the fibers are evenly flared or swaged in the head. The axially aligned orientation of the fibers in the shank of the fastener, particularly in a high-volume percentage, and their evenly swaged relation in the head, in conjunction with the use of certain high temperature thermoplastic resin materials as matrix, results in a fastener having superior high-shear and high-tension capability.

The high temperature thermoplastic resins particularly employed as matrix material for the reinforcing fibers are the resins marketed as "PEEK" resin, understood to be a polyether ether ketone resin and the resin marketed as "PAI" understood to be a polyamide imide resin.

The fastener or rivet of the invention is preferably preformed with a head at one end which can be in the form of a protruding head or a conical head adapted to be received in a countersunk hole of one of the structural components to be fastened. Usually a conical or countersunk head is prefabricated on the fastener or rivet, and a protruding head or another conical head can be formed on the other end of the fastener during installation.

The reinforcing fibers embedded in the high temperature thermoplastic matrix of the invention fastener can be fiberglass, graphite, boron or Kevlar fibers, the latter understood to be a poly (paraphenylterephthalamide).

When the composite fastener or rivet of the invention is used for fastening composite thermoplastic structures, the heating of the rivet head to upset same heats the adjacent composite structure in contact with the head. The composite structure and the rivet head solidify and unify into a substantially integral unit upon cooling. This results in a monolithic assembly with improved load transfer and superior sealing characteristics. This is an important feature of the invention since sealing is a substantial recurring problem in present fastened structures, particularly in fuel and pressurized tanks. However, where the composite structure is a composite thermosetting material, such as fiber-reinforced epoxy, or even a metallic structure, a strong mechanical bond is produced between the upset head and the abutting structure, to produce good sealing.

Thus, the fastener of the invention affords a novel, simple type of fastener for assembling structural components which can be composed of thermosetting or thermoplastic composites, or which can be metallic components. The fasteners of the invention have the following advantages: They have superior tension as well as shear performance, they eliminate the use of structural components and fasteners of dissimilar material, that is, the structural components and fasteners can be of the same composite material, they reduce fastener weight and, when employed in the areas of fuel sealing, provide better sealing potential due to the absence of different coefficients of thermal expansion between the composite structural components and the fasteners, and provide better hole-filling capabilities in terms of thermoplastic forming of the fastener.

BRIEF DESCRIPTION OF THE DRAWINGS

The invention will be more clearly understood by reference to the description below of certain preferred embodiments taken in connection with the following drawings wherein:

FIGS. 5, 6, and 7 illustrate the assembly and upsetting of the rivets of FIGS. 1, 2, and 3, respectively, in an assembly for fastening a pair of structural components together with such rivets;

FIGS. 8 and 9 illustrate use of a riveting tool or heat gun having a conical-shaped point for upsetting the end of a protruding head rivet as illustrated in FIG. 1, during assembly for fastening a pair of structural components;

FIGS. 10 and 11 illustrate introduction of a fiber-reinforced composite rod in an aperture between a pair of composite structural members and the formation of a head on opposite ends of the rod to form a rivet, according to the invention, for fastening the structural components using a heat gun similar to FIGS. 8 and 9;

DETAILED DESCRIPTION OF THE INVENTION AND PREFERRED EMBODIMENTS

Figure 1:
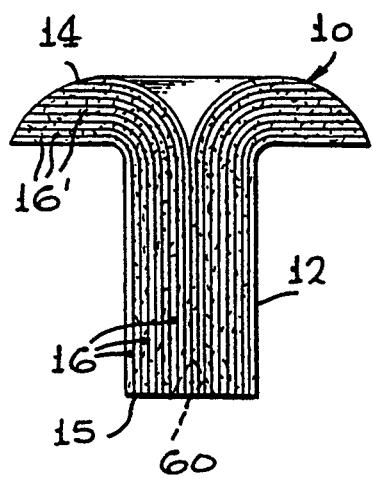
FIG. 1 is an elevational cross-sectional view of a protruding head rivet according to the invention.

Referring to FIG. 1, there is shown a composite fastener 10, according to the invention, comprised of a shank 12 having a protruding head 14 on one end thereof. The shank and head are formed of a high temperature thermoplastic matrix material 15, such as "PEEK" resin, having continuous reinforcing fibers 16 extending axially or longitudinally in substantially parallel relation and closely packed in the matrix material extending throughout the shank. The fibers 16 are bent and flared outwardly into the head, as shown at 16' and extend continuously into the head, the fibers being substantially evenly swaged therein. It will be noted that the continuous fibers 16, 16' have a highly controlled regular fiber orientation, as shown, which is critical in producing a fastener of increased strength, particularly with respect to high-tension capability, as well as high shear strength. This is in contrast to the relatively Lower tension capability of the composite rivet of above U.S. Pat. Nos. 2,510,693; 2,685,813; and 4,478,544, wherein the fibers in the resin matrix are not both (a) in axial parallel alignment in the shank or stem, and (b) evenly flared and swaged in the head.

Figure 2:
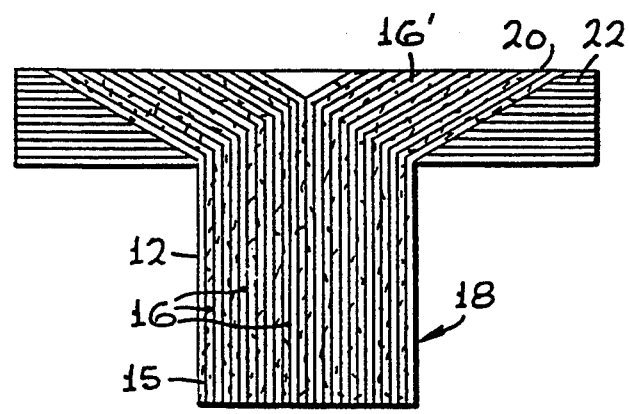
FIGS. 2, 3, 3a, and 4 are elevational cross-sections of various other modifications of rivets according to the invention.

In FIG. 2 there is shown a modification of the protruding head rivet of FIG. 1, the rivet 18 of FIG. 2 having the continuous fibers 16 in close parallel axial alignment throughout the matrix 15 of shank 12 and evenly swaged at 16' in the head 20, as in the head 14 of FIG. 1, except that the protruding head 20 has a composite washer 22 in the form of a fiber-reinforced plastic, such as "PEEK" resin, prefabricated and attached to the lower surface of head 20.

Figure 3:
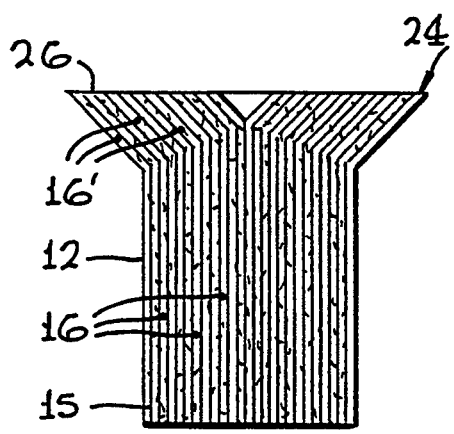

FIG. 3 is another modification of the rivet, according to the invention, indicated at 24, having the same orientation of fibers 16 in the resin matrix 15 of the shank 12, as in FIG. 1, the fibers being evenly swaged at 16' in the countersink head 26 of the rivet. The rivet of FIG. 3 is adapted for assembly of parts, one of which has a countersunk portion to receive the head 26.

Figure 3A:
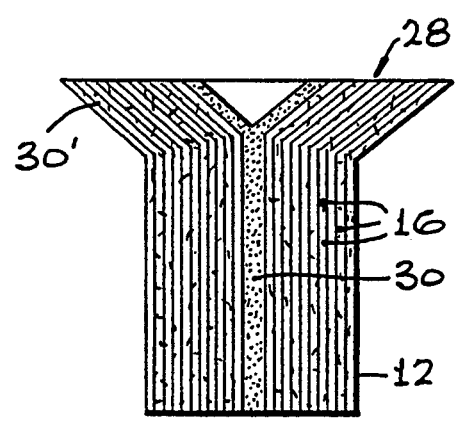

FIG. 3a is a rivet 28 similar to FIG. 3, except that rivet 28 has a thermoplastic core 30 passing through the axis in the shank 12 of the rivet and extending in a flared manner outwardly into the central portion of the head 30' of the rivet. The thermoplastic core 30 can be formed of the same resin as the resin matrix of the rivet in which the fibers 16 are embedded.

Figure 4:
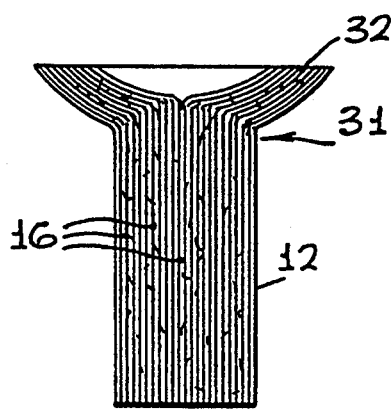

FIG. 4 is still another modification of the fastener or rivet of the invention, the rivet 31 thereof having a countersink head 32 of spherical shape.

Figure 5:
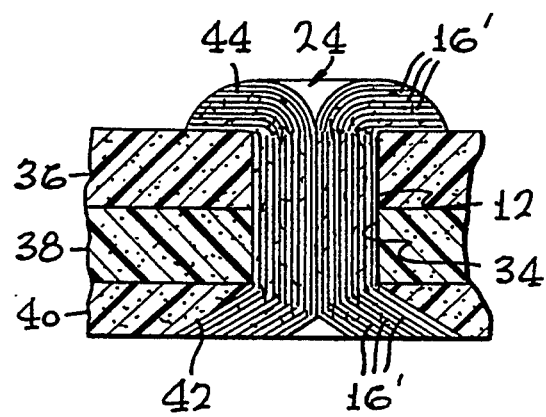

FIG. 5 shows the rivet 24 of FIG. 3 assembled in an aperture 34 between three structural members 36, 38 and 40 for fastening them together. The structural member 40 has a countersunk bore 42 therein. Structural members 36, 38 and 40 can be formed of composite thermosetting or thermoplastic materials, such as graphite-reinforced epoxy or PEEK resin. The opposite end of the shank 12 of rivet 24 is upset to form a protruding head 44, as by an ultrasonic welding tool or by a heated pressure gun, as described in greater detail below. When so upset, it will be noted that the fibers 16' in the resulting protruding head 44 are bent and evenly swaged, as in the case of the fibers 16' in the countersink head 26.

FIG. 6 illustrates use of the protruding head rivet 18 of FIG. 2 for securing together the composite structural members 36 and 38. The rivet 18 is upset at its opposite end to form another protruding head 46 similar to protruding head 20, for example, by means of a suitable ultrasonic gun. The flared and evenly swaged fiber orientation 16' in the upset protruding head 46 is similar to that in the opposite protruding head 20, resulting in a rivet which develops a very high tension capability. An additional composite washer 22' similar to washer 22 is attached to head 46 by placing such washer 22' around the end of rivet shank 12 prior to forming the protruding head 46.

In FIG. 7, the rivet 24 of FIG. 3 is used to assemble composite structural members 36, 38, 40 and 41, similar to FIG. 5, except that two outer structural members 40 and 41 each contain countersunk bores 42 and 42', respectively. In this installation, the end of the rivet opposite the countersink head 26 is upset as by means of a suitable heat gun of a type described below, to form a second countersink head 48 which is received within the countersunk bore 42' of structural member 41 to secure the structural members. Again, the riveting tool produces an upset head 48 wherein the fibers from the shank of the rivet are bent and flared at 16' and are evenly swaged in the head.

Referring now to FIG. 8 of the drawings, in employing a rivet, such as rivet 10, in FIG. 1 for fastening together the composite structural members 36 and 38, the rivet is passed through the aperture 34 in such members, with the head 14 in contact with the outer surface of the structural member 36. A back-up bar 50 is placed in contact with the head 14 of the rivet for supporting same. A steel rod or punch 52 slidably arranged within a metal tube 54 and having a conical tip 56 is positioned with the point 58 of the conical tip 56 abutting the end 57 of the rivet 10. The punch 52 has a diameter approximately equal to the diameter of the rivet 10, and the tube 54 has an inside diameter slightly larger than the diameter of rivet 10 so that one end of the tube 54 can be disposed around the adjacent end of the rivet. The steel punch is then struck to form a small notch or countersink 60 in the center at the end of the rivet opposite the head 14, and the punch is then withdrawn. If desired, the notch 60 can be formed on the rivet when the head 14 is initially formed, as indicated by dotted lines in FIG. 1.

Viewing FIG. 9, a conical point 62 provided on the end 63 of an electric heat gun, indicated at 65, is inserted in the notch 60 formed in the end of the rivet 10. A centering and stabilizing fixture 67 is provided, and pressure is applied. The heat generated by the heat gun on actuation thereof and the pressure applied upsets the end of the rivet to form a protruding head 64 in contact with the structural member 38 to provide a secure fastening of the structural members, with the fibers of the fiber-reinforced rivet again evenly flared and swaged at 16' in the head 64, as in the case of the head 14.

Where the structural members 36 and 38 are composite materials comprised of a fiber-reinforced high temperature thermoplastic material, such as PEEK resin, the heat generated by the heat gun 65, in addition to upsetting the end of rivet 10 to form the head 64, heats the adjacent portion of structural member 38 to soften same, and upon cooling the fastened assembly, solidification of the rivet head 64 and adjacent portions of the abutting structural member 38 occurs, forming a sustantially unitary structure having enhanced strength and improved sealing properties. This is an important feature of the invention.

Now referring to FIGS. 10 and 11, there is illustrated the formation and installation of a rivet according to the invention, commencing with a rod 66 comprised of a high temperature thermoplastic resin matrix 68, such as "PEEK" resin having embedded therein reinforcing fibers 70, such as graphite fibers, extending throughout the length of the rod in close parallel relationship. The rod 66 is provided with central notches 60 at opposite ends 78 thereof. The rod is passed through an aperture 72 in composite, e.g., thermoplastic or metallic, structural members 36 and 38 to be fastened together, the composite member 36 having a countersunk portion 74 in the outer surface thereof.

The structural members are secured together by suitable clamps (not shown), and the conical tip 76' of a heat gun 76 is placed in contact with the notches 60 at each end 78 of the rod 66 and actuated with applied pressure, to soften the resin matrix and upset the opposite ends of the rod 66. In this manner, a protruding head 80 is formed at one end of rod 66 which abuts the outer surface of the structural member 38, and a countersunk head 82 is formed at the other end of the rod which engages the countersunk surface 74 of the structural member 36. In both of the heads 80 and 82 the heat gun with its conical tip causes the fibers 16' to be flared outwardly and to be evenly swaged in the resin matrix, to form a fastener having both high shear and tensile strength, securely fastening the structural members 36 and 38.

Figure 12:
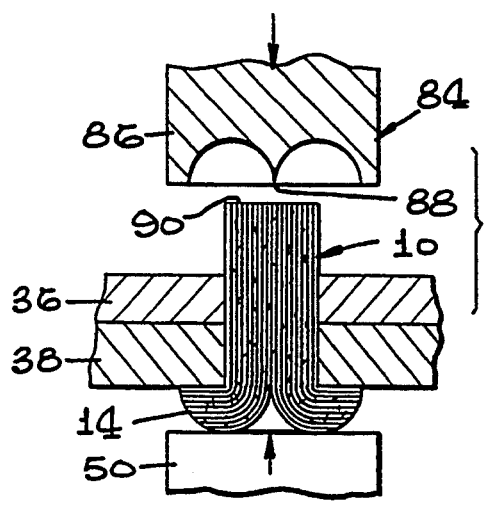
FIGS. 12-15 illustrate the method of upsetting one end of a fiber-reinforced composite rivet according to the invention, employing an ultrasonic forming tool.
Figure 13:
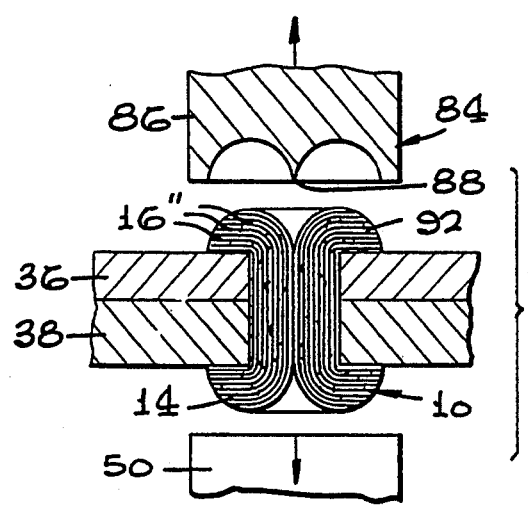

Now referring to FIGS. 12 and 13, there is illustrated the use of ultrasonic flaring for upsetting and forming a head on a rivet of the type illustrated in FIG. 1, according to another embodiment of the invention. In this embodiment, the ultrasonic flaring tool or gun indicated generally at 84 has a horn 86 having a central conical point 88. The composite structural members 36 and 38 are to be fastened by rivet 10 of FIG. 1. A back-up bar 50 is placed in contact with the head 14 of the rivet. The conical tip 88 of the horn 86 is brought into contact with the center at the end 90 of rivet 10, and the ultrasonic tool is actuated. The basic principle of ultrasonic flaring involves conversion of high frequency electrical energy to high frequency mechanical energy in the form of reciprocating longitudinal motion applied to the horn 86. The horn, when pressed against a thermoplastic rivet, passes vibratory energy to the joint area and generates frictional heat at the horn/rivet interface producing a controlled localized softening and melting of the resin at the point of resistance. The high profile of the horn tip will flare the fibers to the desired shape, and when the vibrations cease, the rivet head resolidifies, and the fibers 16" in the head 92 are evenly swaged, as shown in FIG. 13.

The use of ultrasonic flaring is preferred over a heat gun for forming a better shaped head, particularly in conjunction with the use of the high temperature thermoplastic "PEEK" and "PAI" resins employed as the matrix body of the rivet.

Figure 14:
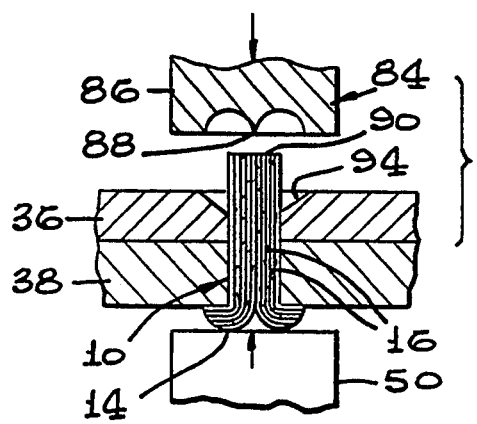
Figure 15:
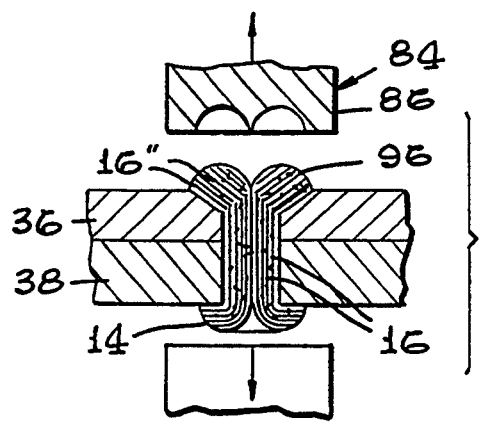

FIGS. 14 and 15 illustrate use of ultrasonic flaring in forming a countersunk rivet head. In this embodiment, the composite structural member 36 has a countersunk bore 94, and as shown in FIG. 15, the horn 86 of the ultrasonic flaring tool forms a head 96 on the rivet which is countersunk and which also has a protruding portion. Again, the fibers 16 of the rivet are flared and evenly swaged in the head 96, as indicated at 16".

Figure 16:
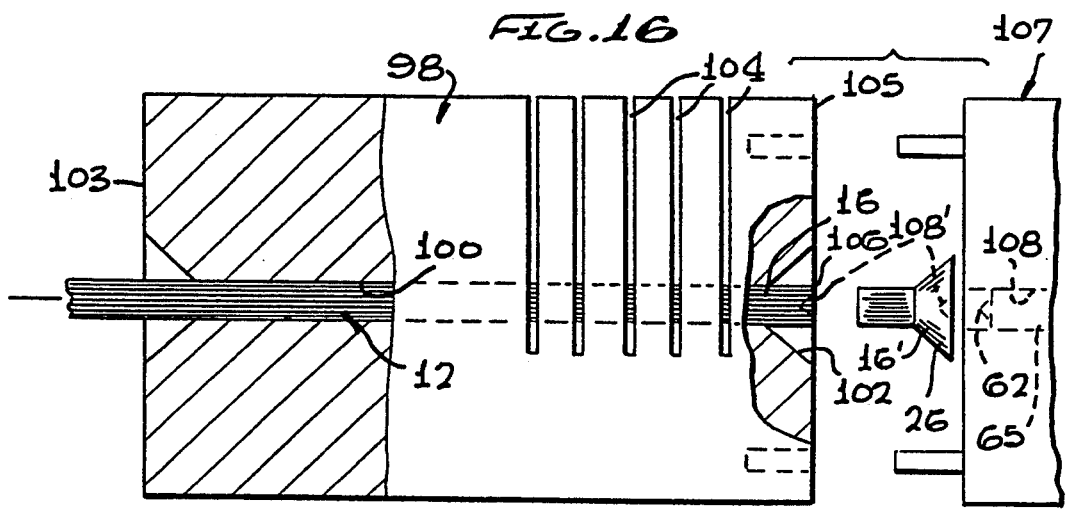
FIG. 16 illustrates a method of forming a fiber-reinforced thermoplastic rivet having a countersink head from a fiber-reinforced thermoplastic rod.

Referring to FIG. 16, there is illustrated a method for manufacturing the fiber-reinforced thermoplastic fastener or rivet, such as the rivet 24 of FIG. 3, having a conical or countersink head. A tool 98 is provided having a central longitudinal bore 100 with a countersunk portion 102 communicating with the bore at one end of the tool. Multiple saw cuts 104 are provided to control rivet length. A fiber-reinforced high temperature thermoplastic resin rod 12 having the fibers extending in parallel axial relation is inserted into the bore 100 at one end 103 of the tool and stopped at the other end 105 by tool 107. A heat gun of the type illustrated at 65 in FIG. 9, or the horn 86 of an ultrasonic welding tool, as illustrated in FIG. 12, is inserted in a central guide hole 108 in tool 107, and the conical point 62 is placed in contact with a central notch 108 on the end 106 of the rod 12 for upsetting the end of the high temperature thermoplastic matrix of the rod 12 to form the countersunk head 26 and to flare the fibers outwardly at 16' and evenly swage the fibers in the head, as seen in FIG. 3. After cooling, a saw is inserted into one of the saw cuts 104 to cut the rivet to the desired length, and the finished rivet is then pushed by rod 12 and removed from the tool.

From the foregoing, it is seen that the invention provides improved high-strength composite fasteners, particularly rivets, having a shank and a head integrally formed thereon, the shank and head comprised of a high temperature thermoplastic matrix, particularly "PEEK" or "PAI" resin, and reinforcing fibers extending longitudinally or axially in close parallel relation in the shank and flared in evenly swaged relation in the head. The resulting fasteners having both high tensile and high shear strength can be upset for fastening structural members, which can be either metallic or composite structural members, by means of a heat gun and particularly an ultrasonic flaring device to form a second head also wherein the reinforcing fibers are flared and evenly swaged, resulting in a strong seal-tight joint, particularly where composite thermoplastic structural members are used. If desired, both heads can be formed during installation for fastening structural members.

It will be understood that the heat gun and ultrasonic welding device, apart from the use of a conical tip used to form a head on a fiber-reinforced thermoplastic rivet, according to the invention, are commercially available and form no part of the present invention.

Since various changes and further modifications of the invention will occur to and can be made readily by those skilled in the art without departing from the invention concept, the invention is not to be taken as limited except by the scope of the appended claims.

What is claimed is:

1. A process for fastening structural components together with a composite fastener, which comprises:

passing a composite fastener through an aperture in said components, said composite fastener comprised of a shank having a first head integrally formed on one end thereof, said first head abutting one of said components, said shank and said head being formed of a high temperature thermoplastic matrix material selected from the group consisting of a polyether ether ketone resin and a polyamide imide resin, and having continuous reinforcing fibers axially oriented in substantially parallel relation throughout the shank, all of said fibers being flared and extending continuously into said first head and substantially evenly swaged therein, placing a forming tool in contact with the other end of said shank, said forming tool capable of softening said matrix material, and upsetting and melting the matrix material on the other end of said shank with said tool under controlled conditions to form a second head and flaring the same into contact with another of said components, all of said fibers in said second head being flared and extending continuously into said second head and evenly swaged therein and thereby securely fastening said components.

2. The process of claim 1, said structural components being composite fiber-reinforced thermoplastic components, said second head, and said another of said components in contact with said second head, forming a substantially integral unit resulting from said upsetting and melting step.

3. The process of claim 1, said forming tool being a heat gun, said heat gun having a conical tip which is placed in contact with the other end of said shank.

4. The process of claim 3, including applying pressure with said heat gun to the other end of said shank for upsetting same to form said second head.

5. The process of claim 1, said forming tool comprising an ultrasonic device containing a longitudinally reciprocable horn, said horn having a conical point and being in contact with the center of the other end of said shank, and energizing said ultrasonic device for actuating said horn and upsetting the other end of said shank to form said second head.

6. The process of claim 1, wherein one of said first and second heads are conical in shape and the other of said first and second heads is protruding.

7. The process of claim 1, wherein both said first and second heads are protruding heads.

8. The process of claim 1, wherein both said first and second heads are conical heads.

9. The process of claim 1, said first head being a conical head and said second head being a protruding head.

10. The process of claim 1, wherein said fibers are selected from the group consisting of graphite, boron, fiberglass and Kevlar fibers.

11. A composite fastener which comprises a shank having a first head integrally formed on one end thereof, said shank and head formed of a high temperature thermoplastic matrix material selected from the group consisting of a polyether ether ketone resin and a polyamide imide resin, and having continuous reinforcing fibers axially oriented in substantially parallel relation throughout the shank, all of said fibers in said first head being uniformly flared from said axial orientation and extending continuously from said shank into said head and being substantially evenly swaged therein, and a second head integrally formed on the other end of said shank, all of said fibers in said second head being uniformly flared from said axial orientation and extending continuously from said shank into said second head and being uniformly and substantially evenly swaged therein, said shank and said heads defining a rivet fastener having high shear and high tensile characteristics.

12. The composite fastener of claim 11, wherein said first head is a protruding head.

13. The composite fastener of claim 11, wherein said first head is a conical head.

14. The composite fastener of claim 11, wherein said first head is a conical head and said second head is a protruding head.

15. The composite fastener of claim 11, said fibers selected from the group consisting of graphite, boron, fiberglass and Kevlar fibers.

16. In combination, a plurality of structural members fastened with at least one rivet, comprising an elongated body of solidified high temperature thermoplastic resin selected from the group consisting of a polyether ether ketone resin and a polyamide imide resin, having a shank and a first head integral with one end of the shank and a second head integral with the other end of the shank, and reinforcing fibers selected from the group consisting of graphite, boron, fiberglass and Kevlar fibers, embedded in said resin and extending longitudinally and in substantially parallel relation in the shank and extending into each of said heads, all of the reinforcing fibers in each head being flared and evenly swaged, said first and second heads being in abutting relation with the outer surfaces of said structural members.

17. The combination of claim 16, said structural members being composite thermoplastic members, said second head formed by heating and upsetting during installation of said at least one rivet and resulting in a substantially unitary structure between said second head and adjacent portions of the abutting structural member.

18. The combination of claim 16, wherein one of said heads is a protruding head and the other is a conical head.

19. The combination of claim 16, wherein at least one of said heads is a protruding head or a conical head.

* * * * *